(12) United States Patent
Abe et al.

(10) Patent No.: US 9,183,450 B2
(45) Date of Patent: Nov. 10, 2015

(54) INSPECTION APPARATUS

(75) Inventors: Yuichi Abe, Mito (JP); Mitsuji Ikeda, Hitachinaka (JP)

(73) Assignee: HITACHI HIGH-TECHNOLOGIES CORPORATION, Tokyo (JP)

(*) Notice: Subject to any disclaimer, the term of this patent is extended or adjusted under 35 U.S.C. 154(b) by 1875 days.

(21) Appl. No.: 11/790,883

(22) Filed: Apr. 27, 2007

(65) Prior Publication Data

US 2007/0258640 A1 Nov. 8, 2007

(30) Foreign Application Priority Data

Apr. 27, 2006 (JP) .................................. 2006-122880

(51) Int. Cl.
*G06K 9/62* (2006.01)
*G06K 9/00* (2006.01)
(Continued)

(52) U.S. Cl.
CPC ............... *G06K 9/03* (2013.01); *G06K 9/6253* (2013.01); *G06T 7/001* (2013.01); *G06T 2207/10048* (2013.01); *G06T 2207/10056* (2013.01); *G06T2207/10116* (2013.01); *G06T 2207/30128* (2013.01); *G06T 2207/30148* (2013.01)

(58) Field of Classification Search
CPC ............. H01J 2237/2817; H01J 37/28; H01J 2237/082; H01J 2237/20292; H01J 2237/24578; H01J 37/21; H01J 2237/221; H01J 2237/24592; H01J 37/20; H01J 37/222; G06T 7/001; G06T 2207/30148; G06T 2207/10061; G06T 7/0044; G06T 7/0026; G06T 7/003; G06T 7/0042; G06T 2207/10144; G06T 2207/30168; G06T 7/2033; G06T 2207/10141–2207/10152; G03F 7/7065; G06K 9/6203; A61M 2205/3306

USPC ......................................................... 382/159
See application file for complete search history.

(56) References Cited

U.S. PATENT DOCUMENTS

| 5,832,108 A | * | 11/1998 | Fukita et al. | 382/159 |
| 2004/0228515 A1 | * | 11/2004 | Okabe et al. | 382/145 |
| 2005/0169517 A1 | * | 8/2005 | Kasai | 382/159 |

(Continued)

FOREIGN PATENT DOCUMENTS

| JP | 05006348 A | * | 1/1993 |
| JP | 7-121494 | | 5/1995 |
| JP | 07-160661 A | | 6/1995 |
| JP | 07-168799 A | | 7/1995 |
| JP | 2006-085278 A | | 3/2006 |
| JP | 2006-105777 A | | 4/2006 |

OTHER PUBLICATIONS

Nagao, T., "Phylogenetic Image Processing", Chapter 5, Shokodo, Japan.

(Continued)

*Primary Examiner* — Kim Vu
*Assistant Examiner* — Michael Vanchy, Jr.
(74) *Attorney, Agent, or Firm* — McDermott Will & Emery LLP

(57) ABSTRACT

An inspection apparatus and method are provided, wherein even when an image that cannot be processed by a current image processing algorithm is input to an image processing unit while a working line is in operation, the inspection can be continued by newly generating an image processing algorithm optimized in keeping with a particular image. The apparatus includes an erroneous recognition detector, a teacher data generator and a switching unit for switching the current image processing algorithm to a new image processing algorithm generated based on an updated teacher data group. As a result, the inspection can be continued without extremely decreasing the accuracy even when an unexpected image is input to the working line.

18 Claims, 9 Drawing Sheets

(51) Int. Cl.
*G06K 9/03* (2006.01)
*G06T 7/00* (2006.01)

(56) References Cited

U.S. PATENT DOCUMENTS

2007/0009152 A1* 1/2007 Kanda .......................... 382/159
2008/0028360 A1* 1/2008 Picciotto et al. ................ 716/21

OTHER PUBLICATIONS

Taniguchi, H., et al., "Mechanism of Exchanging Program Part among Process Running", Journal of the Institute of Electronics, Information and Communications Engineers (Japan), May 1995, pp. 492-499, vol. J78-D-I No. 5, Japan.

Japanese Office Action, with partial English translation, issued in Japanese Patent Application No. 2006-122880, dated Apr. 25, 2011.

* cited by examiner

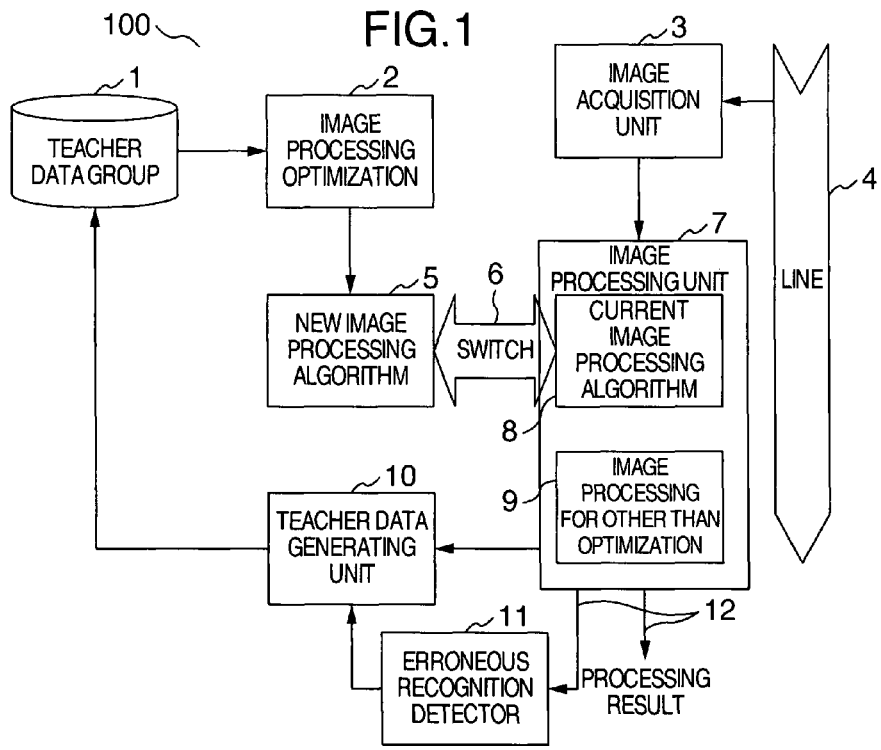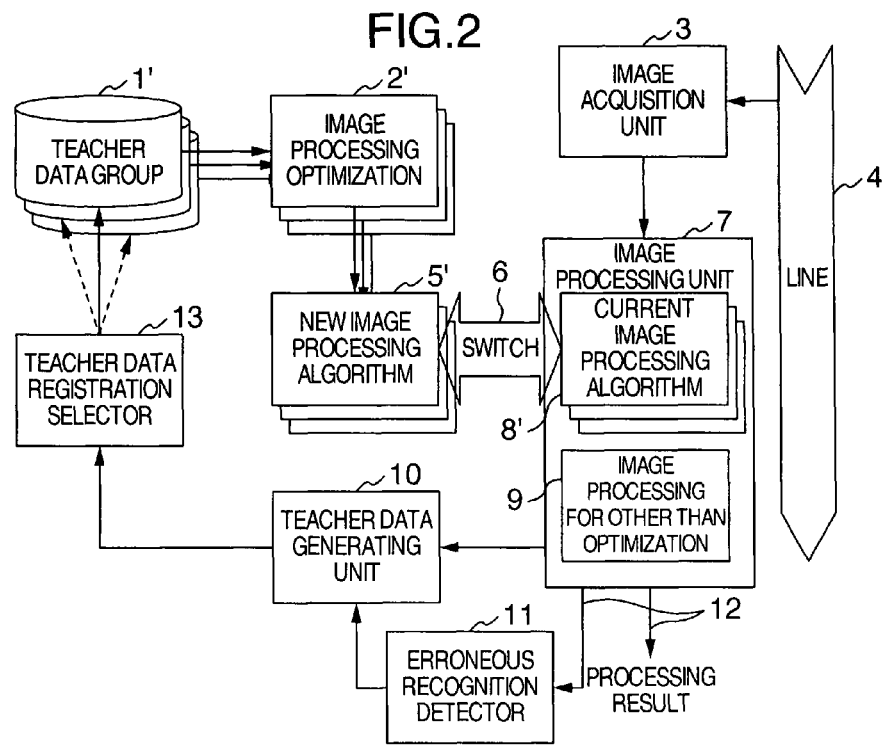

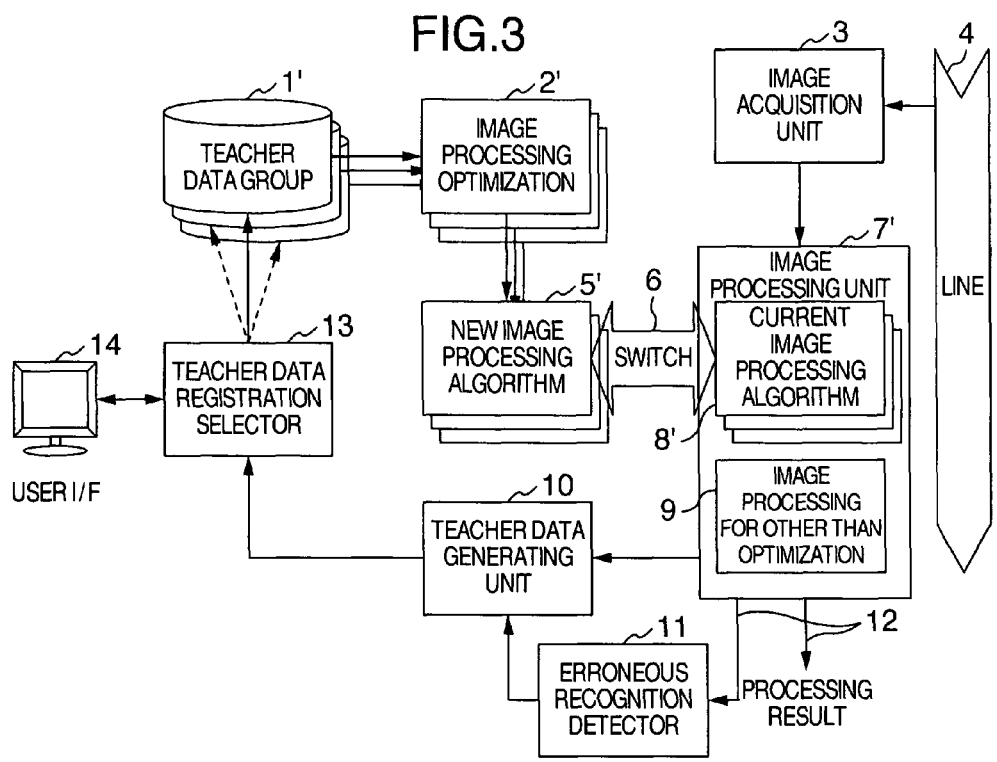

FIG.4

CONFIRM REGISTERED TEACHER DATA SET

☐ IF TEACHER DATA EXCEEDS PREDETERMINED NUMBER, PREDETERMINED NUMBER [10]   ☐ ALWAYS CONFIRM NEWLY GENERATED TEACHER DATA SET
DELETE THE ONE HAVING SMALL EFFECT

| TEACHER DATA GROUP :1 ☐ | INPUT IMAGE | TARGET IMAGE | WEIGHTED IMAGE |

[DELETE SELECTED TEACHER DATA SET]   [REGISTER TEACHER DATA SET]

| CONDITIONS | TEACHER DATA GROUP 0 | TEACHER DATA GROUP 1 | TEACHER DATA GROUP 1 | TEACHER DATA GROUP 1 | TEACHER DATA GROUP 1 |
|---|---|---|---|---|---|
| MAGNI-FICATION | 5K OR LESS | 5k ~ 8k | 8k ~ 15k | 15K OR MORE | |

[DELETE TEACHER DATA GROUP]   [ADD TEACHER DATA GROUP]

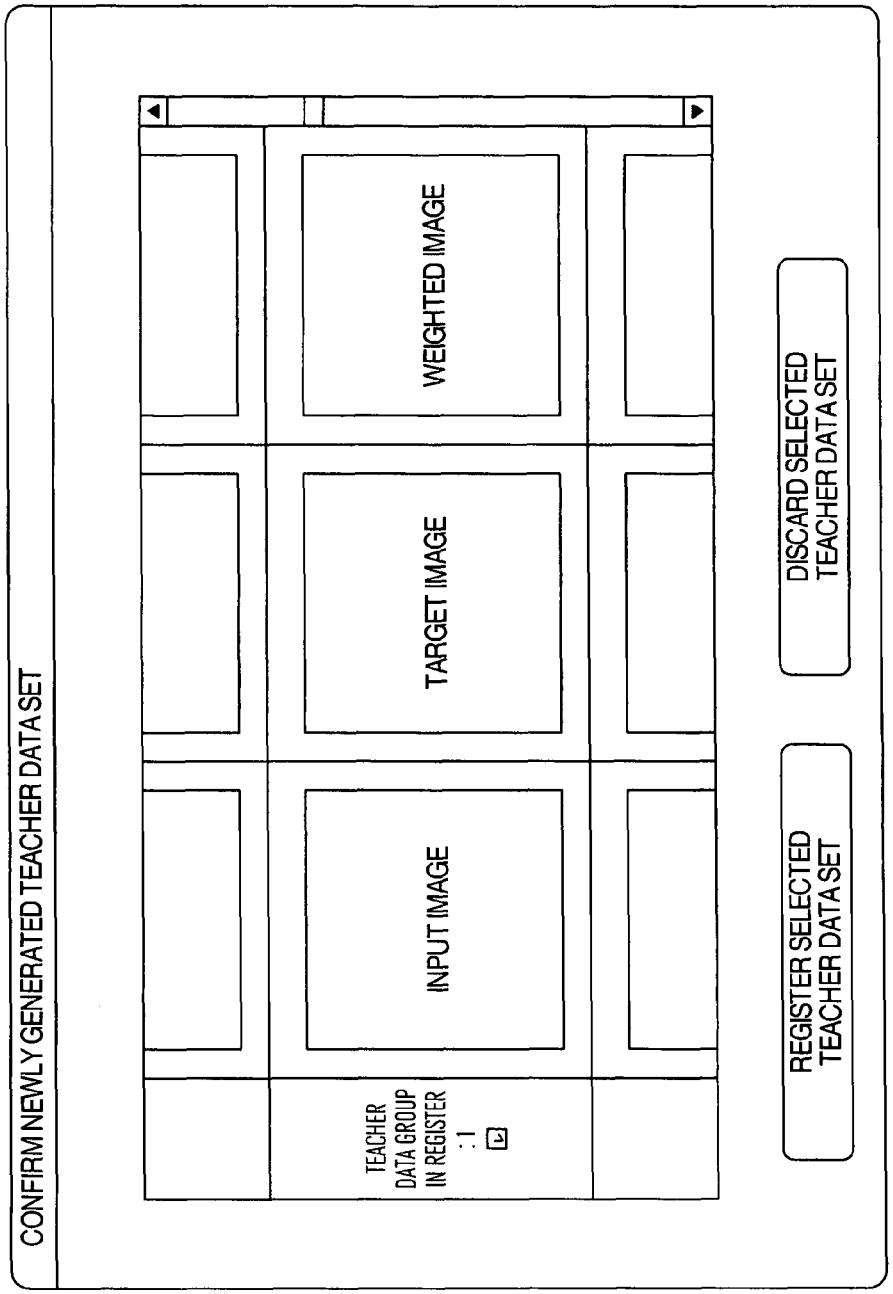

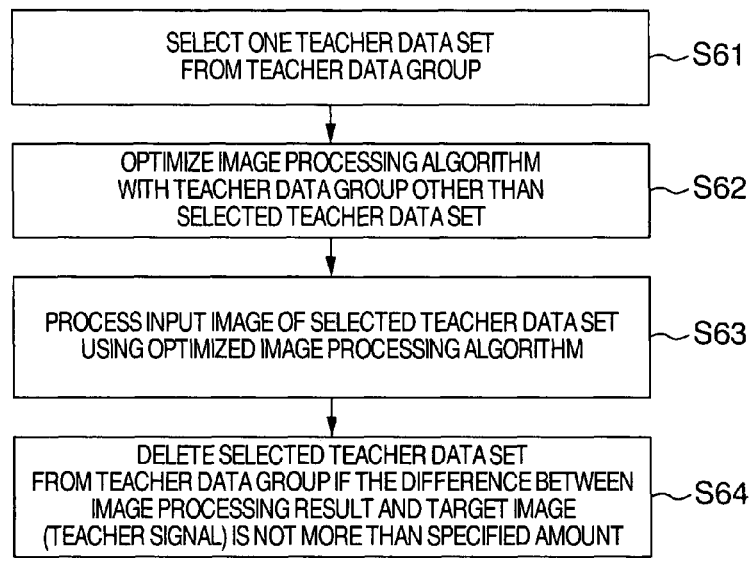
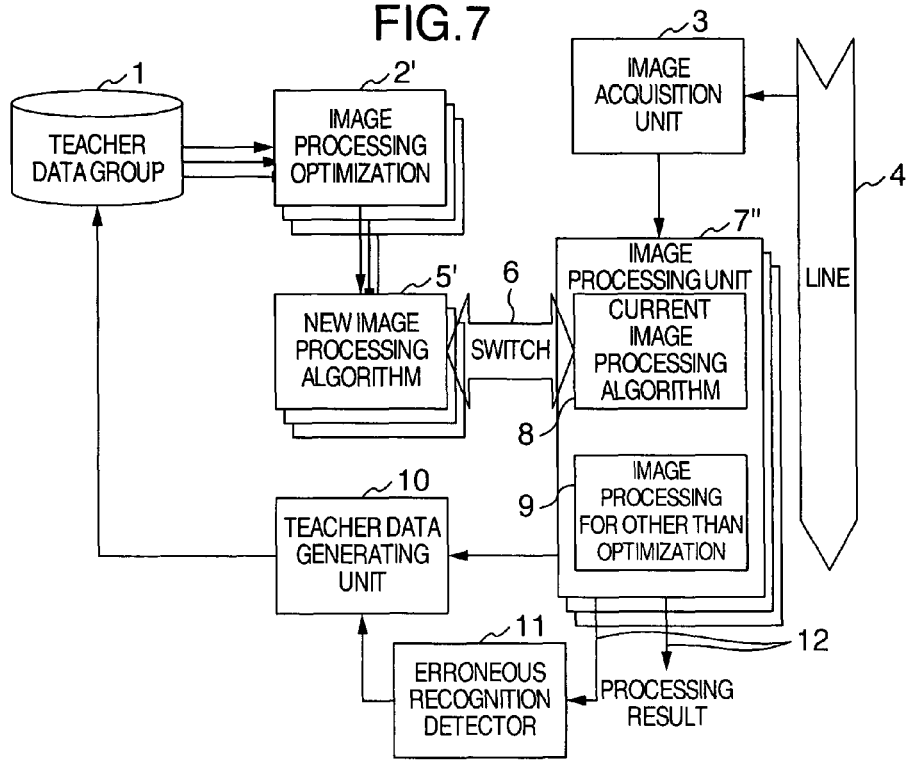

TEMPLATE

NORMALIZED CORRELATION MAP

IMAGE TO BE SEARCHED (OBJECT IMAGE)

OTHER MATCHING POSITIONS

CORRECT MATCHING POSITION

OTHER MATCHING POSITIONS

CORRECT MATCHING POSITION

NORMALIZED
CORRELATION
TARGET IMAGE

NORMALIZED
CORRELATION
WEIGHTED IMAGE

NON-ACCUMULATED IMAGE

4-ACCUMULATED IMAGES

16-ACCUMULATED IMAGES

FOREIGN MATTER POSITION

ORIGINAL IMAGE

IMAGE PROCESSING RESULT OF ABOUT 10TH GENERATION

IMAGE PROCESSING RESULT OF ABOUT 100TH GENERATION

FIG.13A  FIG.13B  FIG.13C
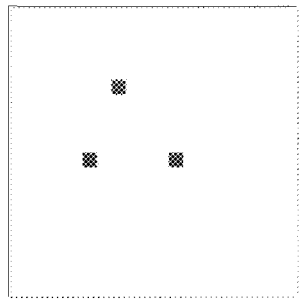
FOREIGN MATTER POSITION
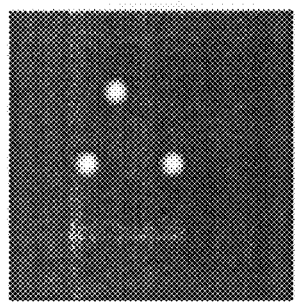
TARGET IMAGE
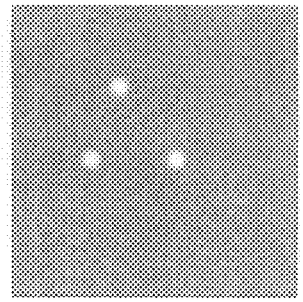
WEIGHTED IMAGE
FIG.14
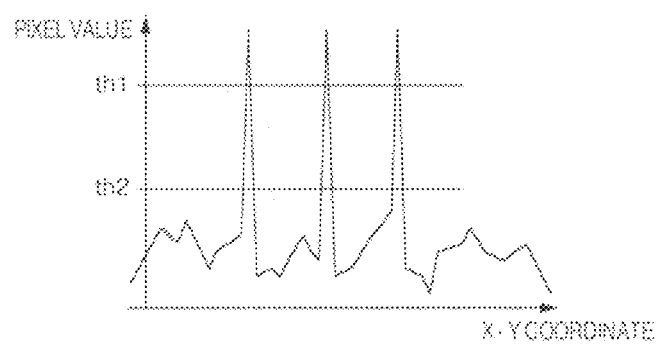

INSPECTION APPARATUS

BACKGROUND OF THE INVENTION

This invention relates to an inspection apparatus for making an inspection by image processing such as a semiconductor inspection apparatus and a foreign matter inspection apparatus for foods or the like.

The conventional inspection apparatus using the image processing is available which can make a highly accurate inspection by optimizing the image processing algorithm.

In the conventional inspection apparatus, for example, the foreign matter contained in a package of frozen foods is detected by the image processing of an X-ray image and an image processing algorithm optimized in accordance with the user situation is automatically generated by use of GA (Genetic Algorithms).

The image processing using GA is explained in detail in Japanese book, in Chapter 5 of "Phylogenetic Image Processing" by Tomoharu Nagao, published by Shokodo. In this image processing, a filter tree with a one-input one-output filter and a two-input one-output filter (constituting a gene) combined into a tree structure is regarded as a chromosome. The chromosome of the next-generation population (mass of chromosomes) is generated by selection, crossing-over and mutation of the current-generation population. In this way, the population makes an evolution in each generation. The direction of evolution is defined by a set of a predetermined original image and a target image (which may include a weighted image, as required), and image processing algorithms (chromosomes) more and more evolved with the original image approaching a target image come to appear in greater numbers through generations.

In this invention, a set of an original image and a target image (and a weighted image in some cases) is referred to as a teacher data set. Although one teacher data set serves the purpose, a plurality of teacher data sets generally exist, and the target image and the weighted image, as compared with the original image, are required to be generated manually. A particular desired image processing algorithm formed by the target image and the weighted image is taught to a system by the human being.

FIGS. 12A to 12D show the manner in which the image processing algorithm for detecting foreign matter in a frozen food is generated by the phylogenetic image processing. FIG. 12A shows the positions of the foreign matter contained in the package of the frozen pilaf constituting a frozen food. The outer peripheral portion where nothing is contained is high in X-ray transmittance and white in color. Inside the package, rice grains and other ingredients appear as an white-flecked image. FIG. 2B shows the original image (not the original image in the teacher data set) as it is. FIG. 12C shows an original image processed by the image processing algorithm (chromosome) formed by the learning (optimization) using the teacher data set and obtained at about the 10th generation. The pixel value at the coordinate having the foreign matter is seen to have become higher than that of rice grains. FIG. 12D, on the other hand, shows an original image processed by the image processing algorithm obtained at about the 100th generation. Once the stage as far as this is reached, the presence or absence can be stably detected with the pixel value of about 6 or 7 as a threshold. In the case under consideration, the last process for detecting the presence or absence of foreign matter using a threshold is not included in the image processing algorithm to be optimized. As described above, all the processes before determining the detection result are not necessarily optimized.

FIGS. 13A to 13D show an example of the target image and the weighted image obtained in this case. FIG. 13A shows an example of the target image involved, in which the pixel values at the positions of foreign matter contained are shown high. The system optimizes the image processing algorithm to obtain this image of the processing result. Specifically, the chromosomes of each generation are evaluated as to the degree to which the result of processing is different from a target image, and if low in evaluation (with the processing result considerably different from the target image), selected and cannot survive to the next generation. In the process, what is important is the degree to which the processing result is different from the target image. In the case where the greater part of the target image is black and only a small part thereof is white as shown in FIG. 13B, a chromosome by which a deep black image is output as the processing result would also gain a high evaluation. Such a chromosome (image processing), however, has no actual significance. In such a case, the condition that the position where foreign matter is contained is as white as in the target image is given priority (weighted) in evaluation, and therefore, the weighted image as shown in FIG. 13C is effectively used. In the weighted image, the coordinate higher in pixel value is weighted more to evaluate the difference from the target image.

On the other hand, JP-A-7-121494 discloses a neural network (perceptron) in which the desired output signal can be easily obtained also for the non-learning input signal by simple learning using the learning input signal and the corresponding teacher signal. It is well known that the pattern can be recognized from the image also using this neural network. Also in this case, a set of the learning input signal and the teacher signal is required to be prepared in advance. The set of the learning input signal and the teacher signal is also called a teacher data set according to this invention. In the pattern recognition using the neural network, the preprocessing such as the noise elimination may be carried out on the input image. According to this invention, however, such a preprocessing is not included in the learning (optimization).

SUMMARY OF THE INVENTION

In the conventional inspection apparatus for optimizing the image processing algorithm, the image processing algorithm is optimized using the teacher data group given in advance. In the case where an image that cannot be processed with the current image processing algorithm is input to the image processing unit on the product manufacturing line in operation, therefore, it is difficult to newly generate an optimized image processing algorithm meeting the requirement of the particular image.

The object of this invention is to provide an inspection apparatus in which the inspection can be continued by generating a newly optimized image processing algorithm even in the case where an image which cannot be processed with the current image processing algorithm is input to the image processing unit while the manufacturing line is actually in operation.

In order to achieve this object, according to one aspect of this invention, there is provided an inspection apparatus for acquiring an image and processing the image, comprising a function of generating an image processing algorithm different from the current image processing algorithm based on the acquired image and a function of switching the current algorithm to the new algorithm According to another aspect of the invention, there is provided an inspection apparatus, wherein in the case where the probability is high that a processing result of an input image obtained by the current image processing algorithm is erroneous, an image processing algorithm different from the current image processing algorithm is generated based on the corresponding input image.

According to still another aspect of the invention, there is provided an inspection apparatus, wherein a new image processing algorithm is generated for an acquired image thereby to generate the image processing result more desirable than that for the current image processing algorithm.

According to yet another aspect of the invention, there is provided an inspection apparatus comprising a function of automatically generating a teacher data for an acquired image and adding it to a database of the teacher data, wherein a new image processing algorithm is generated based on the database of the teacher data.

According to a further aspect of the invention, there is provided an inspection apparatus for generating the teacher data in such a manner as to change imaging conditions and acquire an image again.

According to a still further aspect of the invention, there is provided an inspection apparatus comprising a teacher data generating unit, wherein a target image and, if required, a weighted image or a teacher signal is generated against an image of which the probability is high that the processing result is erroneous, thereby to update a teacher data set.

According to a yet further aspect of the invention, there is provided an inspection apparatus, wherein a new image processing algorithm optimized using the updated teacher data set different from the current image processing algorithm is generated, the apparatus further comprising a switch for replacing the current image processing algorithm with the new image processing algorithm as soon as the latter is completed, and wherein the correct processing result can be obtained also for an image which has thus far been unable to be processed properly.

According to a further aspect of the invention, there is provided an inspection method for acquiring an image and subjecting the image to the image processing, further comprising the steps of generating a new image processing algorithm different from the current image processing algorithm based on the acquired image, and switching the current algorithm to the new algorithm.

According to a still further aspect of the invention, there is provided an inspection apparatus for acquiring an image and subjecting the image to the image processing, comprising a function of generating a new image processing algorithm different from the current image processing algorithm based on the acquired image and a display means for automatically generating the teacher data for the acquired image and displaying the teacher data.

With the inspection apparatus and the inspection method according to this invention, even in the case where an image that cannot be properly processed by the current image processing algorithm is input to the image processing unit on the inspection line in operation, the inspection can be continued by generating a newly optimized image processing algorithm in keeping with the particular image.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram according to a first embodiment of the invention.

FIG. 2 is a block diagram according to a second embodiment of the invention.

FIG. 3 is a block diagram with a user interface (I/F) according to a second embodiment.

FIG. 4 shows an example of the user I/F screen.

FIG. 5 shows an example of the user I/F screen.

FIG. 6 shows the flow of the process for automatically deleting the teacher data set.

FIG. 7 is a block diagram according to a third embodiment of the invention.

FIGS. 13A to 13C show an example of the teacher data set used by the X-ray inspection apparatus for detection of foreign matter.

FIG. 14 shows an example of the method of evaluating the stability of the operation for detecting foreign matter in the X-ray inspection apparatus.

DESCRIPTION OF THE EMBODIMENTS

Figure 8B:
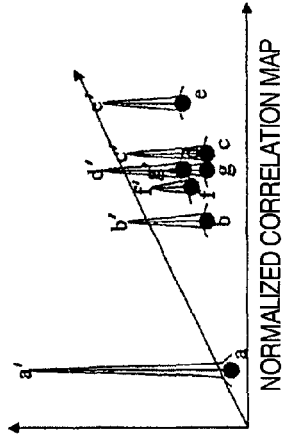
FIGS. 8A to 8F are schematic diagrams showing the pattern matching.

Embodiments of the invention are described below with reference to the drawings.

[Embodiment 1]

FIG. 1 shows an inspection apparatus 100 according to an embodiment of the invention.

An image of an object to be inspected (hereinafter referred to as a sample) which has flowed in on a manufacturing line 4 is picked up by an image acquisition unit 3. The image acquisition unit 3 may be an X-ray sensor of an X-ray inspection apparatus, an electron microscope of a CD-SEM or the review SEM, or a visible-light or infrared-light camera in other cases. The image acquired is sent to an image processing unit 7, where the recognition result and the detection result are obtained as a processing result 12. The image processing unit 7 may execute the image processing 9 without using an optimized image processing algorithm as well as according to an imaging processing algorithm 8 optimized by a teacher data group 1. The image processing 9 without using the optimized image processing algorithm is the last portion of the operation in which the presence or absence of foreign matter is determined based on a threshold value for the X-ray inspection apparatus, and a preprocessing such as noise elimination for the neural network.

An erroneous recognition detector 11, based on the information generated in the image processing unit 7, detects that the probability is high that the processing result 12 (recognition or detection result) is erroneous. The erroneous recognition may be detected in any of various ways, and an example with the X-ray inspection apparatus is explained below.

FIG. 14 shows an example of detection of an erroneous recognition from the image resulting from the processing in the X-ray inspection apparatus according to the image processing algorithm. The abscissa represents the x-y coordinate, and the ordinate the pixel value. Characters th1 and th2 designate threshold values. The relation holds that th1>th2, and in the case where the pixel value at a given coordinate is not less than th1, it is determined that foreign matter exists at the particular coordinate, while in the case where the pixel value at a given coordinate is not more than th2, it is determined that no foreign matter exists at the particular coordinate. As long as the apparatus operation remains in the stable state for detection of foreign matter, none of the pixels assumes a value between th1 and th2. Unless the image processing algorithm is properly optimized, however, the pixel value may exist between th1 and th2. According to this method, as described above, two threshold values are set, and in the case where a pixel value exists between these threshold values, the erroneous recognition detector determines that the probability of erroneous recognition is high.

In the case where the erroneous recognition detector 11 detects the state in which the probability of erroneous recognition is high, the teacher data generating unit 10 generates a target image and, if required, a weighted image or a teacher signal for the particular input image, and updates the teacher data. In the X-ray inspection apparatus, another X-ray sensor may be added in the last stage and upon detection of an erroneous recognition, the line speed is decreased and the X-ray dose increased thereby to acquire the image again. By increasing the X-ray dose, a satisfactory image high in contrast is obtained, and this image is input again to the image processing unit. Then, the coordinate at which foreign matter exists is determined, so that a target image and a weight image can be generated in which the coordinate thus determined is high in pixel value while the other coordinates are low in pixel value. The teacher data are not frequently generated, and therefore, the repeated image acquisition results in no great time loss.

The target image, etc. generated by the teacher data generating unit 10, together with the corresponding input image, are added to the teacher data group 1 as a teacher data set. Once the teacher data group 1 is updated, a new image processing algorithm 5 is generated by optimization of the image processing through an image processing optimizer 2. Upon completion of the new image processing algorithm, the current image processing algorithm 8 is replaced with the algorithm 8 by a switch 6 at an appropriate timing. In the case where the image processing algorithm is packaged as a program, the program is updated at an appropriate timing, as described in "How to Replace Program Partially during Process Execution", Journal of The Institute of Electronics, Information and Communication Engineers, Vol. J78-D-I, No. 5, pp. 492-499, 1995. In the case where the image processing algorithm is packaged in FPGA (Field Programmable Gate Array), on the other hand, a new image processing algorithm may be written in a logic memory, and the current image processing algorithm, at a proper timing not in operation, may be rewritten into the logics of the new image processing algorithm.

Figure 8F:
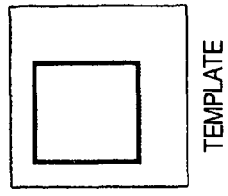
Figure 8A:
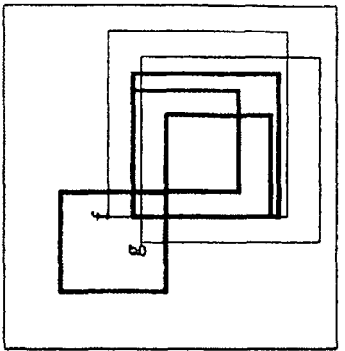
Figure 8D:
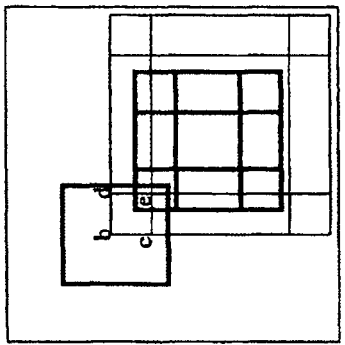
Figure 8C:
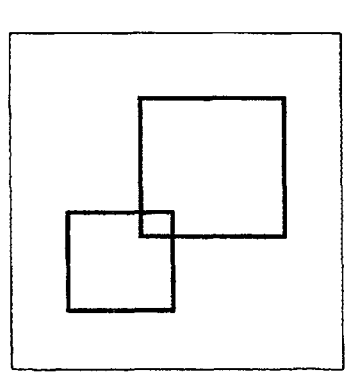
Figure 8E:
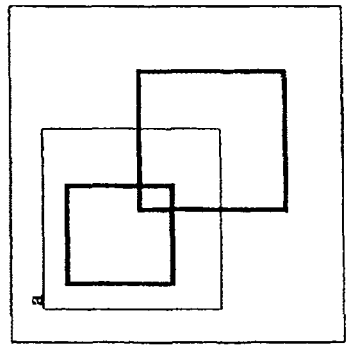

Next, the pattern detection (template matching) in CD-SEM is explained with reference to FIGS. 8A to 8F. FIG. 8A shows an image to be searched, and FIG. 8B a template (reference image). The template matching is a process of detecting the same portion as the template from the image to be searched. Specifically, the template is superposed while being displaced on the image to be searched (hereinafter referred to as the object image), and by calculating the normalized correlation, a point highest in correlation value is determined as the point having the same pattern as the template. The CD-SEM is an inspection apparatus for measuring a specified point on the semiconductor wafer using the scanning electron microscope. In order to specify a point to be measured on the wafer, a portion having a unique pattern in the neighborhood of the measurement point is registered as a template at the initial time of wafer measurement. In the subsequent measurement of the same point, the measurement point is specified based on the coordinate obtained by template matching. In FIG. 9, the same pattern as the template is found at position a in FIG. 8C. Though not identical in pattern, on the other hand, points having the next highest correlation value are four including points b, c, d and e in FIG. 8D. Further, points having the second next highest correlation value include f and g shown in FIG. 8E. The other points, having substantially no correlation, is almost 0 in correlation value. FIG. 8F is what is called a normalized correlation map showing an image having a pixel value as the correlation value for each coordinate. The value at point a is a' near to unity. The points b, c, d, e, f and g assume values b', c', d', e', f' and g', respectively, which are low as compared with a'.

In template matching, the filter operation such as noise removal and the edge emphasis is performed as the preprocessing on the input image before calculation of the normalized correlation. This preprocessing is determined by the phylogenetic image processing according to the invention. In this case, the target image only for the preprocessing is difficult to conceive. This is by reason of the fact that a particular preprocessing which can give a stable normalized correlation map cannot be easily imagined. In view of this, the target image and the weighted image are studied below with regard to the preprocessing for optimization and the subsequent calculation of the normalized correlation combined, i.e. the normalized correlation map.

Figure 9A:
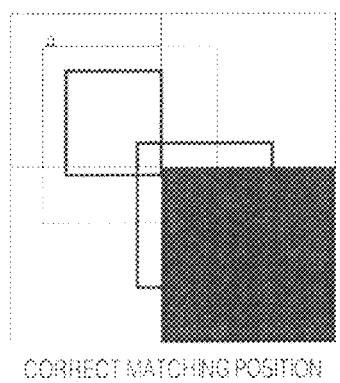
FIGS. 9A to 9C show an example of a target image used for pattern matching.
Figure 9B:
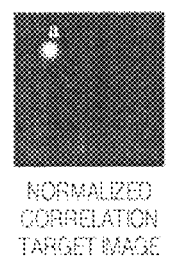
Figure 9C:
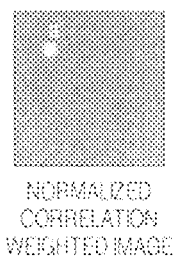

FIGS. 9A to 9C show the target image and the weighted image of the normalized correlation map. As shown in FIG. 9A, the size of the normalized correlation map is equal to the size of the object image less the size of the template. The target image (FIG. 9B) and the weighted image (FIG. 9C) are determined to maximize the value at point a in the normalized correlation map.

Figure 10A:
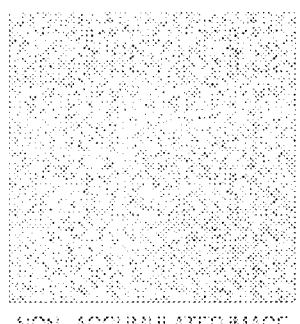
FIGS. 10A to 10C show an example of the acquired image of the CD-SEM according to the number of accumulations.
Figure 10B:
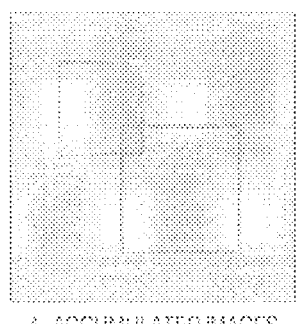
Figure 10C:
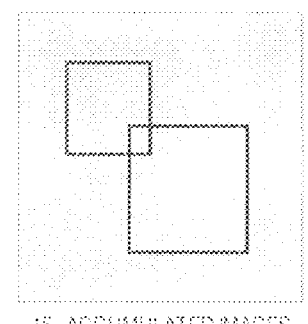

The image acquisition unit of the CD-SEM is a scanning electron microscope. The image under the scanning electron microscope contains very many noises, and the image obtained only by one scan, as shown in FIG. 10A, is ambiguous in pattern with the information buried in noises. Generally, therefore, the images are accumulated by several scans so that random noises are offset and only the information comes to appear. FIG. 10B shows an accumulation of four images by four scans, and FIG. 10C an accumulation of 16 images by 16 scans. With the increase in the number of the times the images are accumulated in this way, the image quality is improved.

Figure 11:
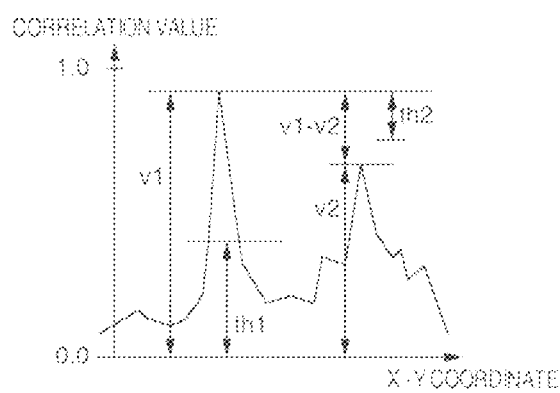
FIG. 11 shows an example of the method of evaluating the stability in pattern matching.
Figure 12A:
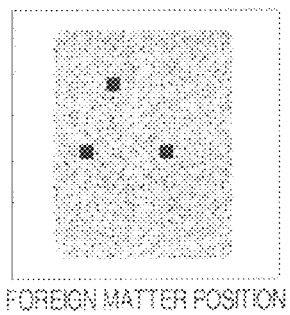
FIGS. 12A to 12D show an outline of the operation of the X-ray inspection apparatus for detecting foreign matter.
Figure 12B:
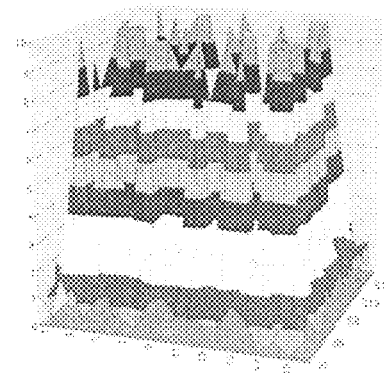
Figure 12C:
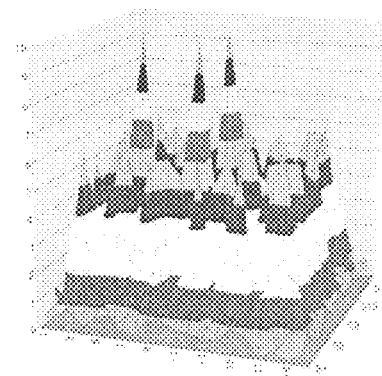
Figure 12D:
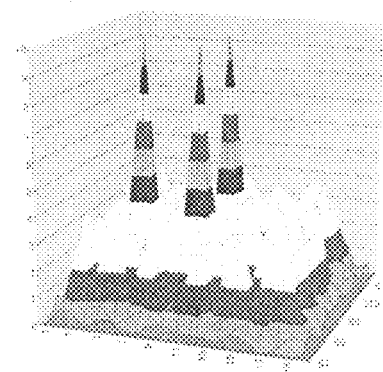

FIG. 11 is a diagram for explaining the behavior of the erroneous recognition detector in template matching. In FIG. 11, the abscissa represents the x-y coordinate, and the ordinate the correlation values. The point associated with the highest correlation value is the one matched best with the template. In order to secure a stable normalized correlation map, the maximum correlation value v1 is required to be larger than the predetermined threshold value th1. Also, some difference is required between the second largest correlation vale v2 and v1. Therefore, the value v1 less v2 is required to be larger than the predetermined threshold value th2. In the case where these two conditions fail to be met, it can be determined that the probability of the erroneous recognition by the erroneous recognition detector is high.

In template matching, the teacher data generating unit acquires the point matched with the template again by increasing the number of accumulations of the object image and inputting again an image with a small number of noises to the image processing unit. Thus, the target image and the weighted image of the normalized correlation map are obtained for the particular point of a high value. The teacher data is not generated so frequently, and therefore, the repeated image acquisition results in no great time loss.

To increase the calculation speed of the normalized correlation value, it is common practice to determine a matching point roughly from the image with the data reduced at equal intervals in the template and the object image, and calculate the normalized correlation in detail for the surrounding images with no data reduced. As a result, the speed is greatly increased in spite of an decreased matching accuracy.

In another method of generating a target image using the teacher data generating unit, the image is not acquired again but the normalized correlation is calculated without reducing the data, so that the matching point is obtained with high accuracy. This method can of course be combined with the aforementioned method of acquiring an image with a small number of noises again.

FIG. 2 shows another embodiment of the invention. This embodiment, unlike the first embodiment described above, has a plurality of teacher data groups 1' processing optimizer 21, new image processing algorithms 5' and present image processing algorithms 7' (current image processing algorithm 8'). Also, due to the presence of a plurality of teacher data groups, this embodiment further includes a teacher data registration selector 13 for selecting a particular teacher data group to which the teacher data generated in the teacher data generating unit 10 is to be added.

It is generally difficult to optimize the image processing algorithm in such a manner as to process an image having a totally different appearance as desired. According to this embodiment, therefore, the teacher data groups are divided in accordance with the image characteristics to facilitate the optimization.

In the CD-SEM, the imaging parameter having a great effect on the image quality such as the dose (the amount of electrons injected per unit area) or the magnification is often known as recipe (measurement steps) information. Also, the feature amounts such as S/N and the contrast deeply related to the image quality can be obtained by simple image processing. Using these known information on image quality, the teacher data groups are classified and the image processing algorithm is optimized for each teacher data group. The teacher data registration selector selects the register of a newly generated teacher data using the known information on image quality.

Once the image is acquired, the image processing is carried out by selecting the current image processing algorithm based on the feature amounts related to the image quality determined by the simple processing or the recipe information obtained as the result of image acquisition.

FIG. 3 shows an embodiment in which the teacher data registration selector according to the embodiment shown in FIG. 2 includes and uses a user interface (I/F) 14. The user, through this user I/F, can register or delete the teacher data set and add or delete the teacher data group.

FIG. 4 shows a screen for confirming the registered teacher data set.

In the upper child window, the teacher data set in registration is displayed together with the information on the teacher image group of which the teacher data set is registered. The teacher data set is selected by a check box, and the button "DELETE SELECTED TEACHER DATA SET" is clicked. Then, the selected teacher data set is deleted. In the case where the button "REGISTER TEACHER DATA SET" is clicked, on the other hand, the teacher data set held in storage is registered in teacher data group corresponding to the image quality of the teacher data set.

The lower child window indicates the conditions (imaging magnification, S/N, etc.) on which the teacher data set is registered in each of the existing image data groups. In the case where the button "DELETE TEACHER DATA GROUP", is clicked, the teacher data group having the largest number is deleted. At the same time, the condition for each teacher data group is required to be changed so that the image set registered in the teacher data group thus deleted can be transferred to another teacher data group.

In the case where the button "ADD TEACHER DATA GROUP" is clicked, on the other hand, a teacher data group having a large number is newly added. Unless the condition for each teacher data group is changed, however, the teacher data set cannot be registered in the new teacher data group.

In the case where the check box "IF TEACHER DATA EXCEEDS PREDETERMINED NUMBER, DELETE THE ONE HAVING SMALL EFFECT" is checked in the upper part of the window, a teacher data set less affected is automatically deleted in the case where the number of the teacher data sets exceeds the number designated by "PREDETERMINED NUMBER".

The steps of deleting the teacher data set automatically are shown in FIG. 6. First, one teacher data set is selected from the teacher data group (S61). Next, the image processing algorithm is optimized in the teacher data group except for the selected data set (S62). Then, the input image of the selected teacher data set is subjected to image processing using the optimized image processing algorithm (S63). Finally, in the case where the difference between the image processing result and the target image is not more than a specified amount, the selected teacher data set is deleted from the teacher data group (S64). Unless the difference is not more than the specified amount, on the other hand, the process is returned to the first step, and started by selecting another one teacher data set from the teacher data group. Thus, the process is repeated until the teacher data set can be deleted. If no teacher data set can be deleted, the user is notified.

In the case where the check box "ALWAYS CONFIRM NEWLY GENERATED TEACHER DATA SET" in the upper right part of the window "CONFIRM REGISTERED TEACHER DATA SET", the window "CONFIRM NEWLY GENERATED TEACHER DATA SET" opens at the time of generation of a new teacher data set. An example of display according to this embodiment is shown in FIG. 5. In the case where this window is already open, it is left so open, and the newly generated teacher data set, together with the information on the teacher data group in register, is displayed in the child window therein. The teacher data set selected by the check box is registered in the teacher data group in register by clicking the button "REGISTER SELECTED TEACHER DATA SET", while the selected teacher data set is discarded without being registered if the button "DISCARD TEACHER DATA SET IN REGISTER".

FIG. 7 shows a third embodiment of the invention. According to this embodiment, a plurality of new image processing algorithms 5' are generated independently of each other using a single teacher data group. A plurality of corresponding image processing units 7" are arranged in parallel to each other, and an image, if acquired, is input to all the image processing units 7". In the case where all the image processing units 7" have the same processing result, the particular processing result constitutes the processing result as a whole. In the case where any of the processing results of all the image processing units 7" fail to coincide, on the other hand, it is determined that the probability of erroneous recognition by the erroneous recognition detector 11 is high.

This invention is applicable to a semiconductor inspection apparatus, a foreign matter inspection apparatus for foods or the like inspection apparatuses for conducting the inspection by image processing. Examples of applications include the X-ray inspection apparatus, the electron microscopes such as CD-SEM and the review SEM and cameras using visible light or infrared light.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An inspection apparatus for acquiring an image and subjecting the acquired image to image processing, comprising:
   an image processor which executes image processing on an image to be provided to template-matching using a first image processing algorithm;
   an erroneous recognition detector which determines whether or not a score of a matching position of the template-matching and a difference between the score of the matching position and a score of another matching position satisfy a predetermined condition;
   a teacher data generator, wherein the teacher data generator obtains an image using an image acquisition condition for obtaining an image having higher image quality than the image determined not to satisfy the predetermined condition when the erroneous recognition detector determines that the predetermined condition is not satisfied;
   an image processing optimizer which optimizes an image processing algorithm for the image to be provided to template-matching by setting the image acquired by the teacher data generator as a target image; and
   a switching unit which switches the first image processing algorithm of the image processor to a second image processing algorithm, wherein the second image processing algorithm is optimized by the image processing optimizer.

2. The inspection apparatus according to claim 1, further comprising means for automatically generating a teacher data for the acquired image and adding the teacher data to a teacher database to generate a new image processing algorithm based on the teacher database.

3. The inspection apparatus according to claim 2, wherein the teacher data is generated while at the same time changing imaging conditions and acquiring the image based on the changed imaging conditions again.

4. The inspection apparatus according to claim 2, wherein the teacher data is generated by subjecting the acquired image to image processing higher in accuracy than the first image processing.

5. The inspection apparatus according to claim 2, wherein a plurality of new image processing algorithms are generated independently of each other from the teacher database.

6. The inspection apparatus according to claim 5, further comprising means for determining that probability is high that a processing result is erroneous by carrying out a plurality of image processing in parallel by image processing units and comparing processing results of the image processing units.

7. The inspection apparatus according to claim 2, wherein:
   a plurality of databases of the teacher data are included, and
   a particular one of the databases to which the teacher data is to be added is determined based on information relating to conditions for picking up the acquired image.

8. The inspection apparatus according to claim 2, further comprising means for confirming the contents of the database of the teacher data through a user.

9. The inspection apparatus according to claim 8, wherein the user can add a new teacher data to the database of the teacher data.

10. The inspection apparatus according to claim 8, wherein the user can separate or integrate the database of the teacher data.

11. The inspection apparatus according to claim 2, wherein teacher data having a lesser effect are deleted automatically from the database of the teacher data.

12. The inspection apparatus according to claim 1, further comprising means for determining that probability is high that a processing result is erroneous based on the stability of detect ability.

13. An inspection method for acquiring an image and subjecting the acquired image to image processing, comprising the steps of:
   executing the image processing on an image to be provided to template-matching using a first image processing algorithm, using an image processor;
   determining whether or not a score of a matching position of the template-matching and a difference between the score of the matching position and a score of another matching position satisfy a predetermined condition; and
   when the first image does not satisfy the predetermined condition:
   obtaining an image using an image acquisition condition for obtaining an image having higher image quality than the image determined not to satisfy the predetermined condition,
   optimizing a second image processing algorithm for the image to be provided to template-matching, using an image processing optimizer, by setting the image obtained image as a target image, and
   switching the first image processing algorithm of the image processor to the second image processing algorithm, which is optimized by the image processing optimizer.

14. The inspection method according to claim 13, wherein when probability is high that a processing result obtained from the first image processing algorithm is erroneous, the second image processing algorithm different from the first image processing algorithm is generated based on a corresponding input image.

15. The inspection method according to claim 13, further comprising the step of generating a new image processing algorithm capable of producing an image processing result more desirable for the acquired image than the first image processing algorithm.

16. The inspection method according to claim 13, further comprising the steps of:
   automatically generating teacher data for the acquired image and adding the teacher data to a database of teacher data; and
   generating a new image processing algorithm based on the database of the teacher data.

17. An inspection apparatus for acquiring an image and subjecting the acquired image to image processing, comprising:
- an image processor which executes image processing on an image to be provided to template-matching using a first image processing algorithm;
- an erroneous recognition detector which determines whether or not a score of a matching position of the template-matching and a difference between the score of the matching position and a score of another matching position satisfy a predetermined condition;
- a teacher data generator which obtains a target image using an image acquisition condition, the target image having higher image quality than the first image determined not to satisfy the predetermined condition when the erroneous recognition detector determines that the predetermined condition is not satisfied; and
- a display for displaying the target image obtained by the teacher data generator.

18. The inspection apparatus according to claim 17, wherein the display means carries out a plurality of image processing steps in parallel, and the display means compares and displays.

\* \* \* \* \*